United States Patent [19]
Baker et al.

[11] 3,754,932
[45] Aug. 28, 1973

[54] PROTEARE AND PECTMARE ADDITIVE TO CITRUS JUICES

[75] Inventors: Robert A. Baker; Joseph H. Bruemmer, both of Winter Haven, Fla.

[73] Assignee: The United States of America as represented by the Secretary of Agriculture, Washington, D.C.

[22] Filed: Apr. 16, 1971

[21] Appl. No.: 134,834

[52] U.S. Cl............................ 99/106, 99/55, 99/211
[51] Int. Cl............................ C12b 1/02, A23l 1/02
[58] Field of Search...................... 99/105, 106, 155, 99/211; 195/111

[56] References Cited
UNITED STATES PATENTS

| | | | |
|---|---|---|---|
| 1,338,684 | 5/1920 | Dunlap | 99/106 |
| 2,082,426 | 6/1937 | Schoop | 99/155 |
| 2,563,855 | 8/1951 | McColloch | 99/106 |
| 2,995,448 | 8/1961 | Kew | 99/106 |
| 3,506,460 | 4/1970 | Bayne | 99/211 |

OTHER PUBLICATIONS

Technology of Wine Making (2nd ed.), Amerine et al. Aui Publishing Co. Inc., Westport, Conn., 1967.

*Primary Examiner*—Norman Yudkoff
*Assistant Examiner*—Martin G. Mullen
*Attorney*—R. Hoffman and W. Bier

[57] ABSTRACT

A method of stabilizing the cloud of citrus juices is disclosed. The method consists of treating the freshly extracted juice with a pectinase containing polygalacturonase activity. The addition of a proteolytic enzyme enhances the breakdown of calcium pectate by polygalacturonase. Spoilage is prevented by including a chemical sterilant in the preparation of the stabilization treatment.

2 Claims, No Drawings

PROTEARE AND PECTMARE ADDITIVE TO CITRUS JUICES

A non-exclusive, irrevocable, royalty-free license in the invention herein described, throughout the world for all purposes of the United States Government, with the power to grant sublicenses for such purposes, is hereby granted to the Government of the United States of America.

This invention relates to a method of preserving desirable appearance and flavor of certain citrus juices while processing these to eliminate unwanted factors. Specifically, this invention relates to a method of protecting the natural cloud of citrus juices by enzymic removal of the water-soluble pectins and insoluble pectates contributing to its loss. This treatment, when combined with cold chemical sterilization, produces a sterile juice with a stable cloud without heating.

A search of the prior art reveals that all citrus juice, even that sold as fresh chilled juice, is generally subjected to some form of heat treatment. The theory has been that this treatment is necessary not only for the destruction of spoilage organisms, but also for the inactivation of enzymes which bring about clarification of the juice. Without the heat treatment the loss of cloud lowers the quality of the juice before spoilage occurs.

The term "cloud," as used in this specification, refers to an ill-defined aggregation of particulate colloidal materials in citrus juices which impart to said juices an appetizingly cloudy appearance which one normally associates with fresh juice. If this cloud settles out the remaining clear, watery serum is visually unappealing and relatively flavorless. It is felt that the enzyme pectinesterase is responsible for the events leading to the loss of the cloud. It is presumed that this enzyme converts the soluble pectins of the juice to pectic acids, which are precipitated as insoluble pectates. In precipitating, these pectic acid salts entrain the finely divided particles of the juice and coprecipitate them.

At the pH of citrus juices a more severe temperature treatment is required to inactivate the pectinesterase than is necessary for the prevention of microbial deterioration. In addition there is no quick practical way to measure the degree of cloud stability being produced. Thus, there is a tendency to exceed the minimum temperature requirements to remove any possibility of clarification. The result of excessive heat treatment is a partial or complete loss of the fresh natural flavor and the development to some degree of a cooked off-flavor. Recent developments in the art of sterilization, notably in the use of cold chemical sterilants such as diethylpyrocarbonate (DEPC), promise to eliminate the need for heat as a means of preservation. Such sterilants, which require no heat for their action and which are converted within hours to harmless end products, would be ideal for the protection of the delicate flavor notes of citrus juices.

Cold sterilants such as DEPC have already been proven to be both practical and effective in sterilizing other beverages. In beer, for which DEPC has received FDA clearance, use of DEPC already is the predominant method of sterilization. Use of the method described herein would allow the manufacturer to produce a juice of favorable cloud stability with fresh flavor. This invention would not be limited in practice to single-strength juice, but could be applied to concentrated juices as well.

A process is here disclosed wherein the natural cloud of fruit juice is stabilized and the juice is protected against clarification. This is accomplished by the addition of an enzyme preparation containing polygalacturonase activity and protease activity to the fresh juice immediately after it has been extracted. The addition of these enzymes in the proper concentrations produces a juice having a stable cloud (as measured by an objective method such as that of Senn, V.J., M. D. Murray and R. T. O'Connor, ARS 72-8, Oct. 1955) equal to or superior to the cloud of freshly extracted juice. No further treatment is necessary to remove or inactivate the added enzymes. Such juice or concentrate could then be protected against microbial deterioration by treatment with a cold process chemical sterilant.

The main object of the present invention is to provide a method of stabilizing the cloud of citrus juices to preserve the appearance of fresh, canned, and concentrated citrus juices.

The problem of clarification in orange juice may be attributed indirectly to the action of the native enzyme pectinesterase on juice soluble pectin. If allowed to act, this enzyme removes methoxy groups from the pectin molecule, producing demethylated pectin. It is this reaction product which, by precipitating as calcium pectate, causes cloud loss. It is assumed that the calcium pectate occludes the cloud particles and removes them from suspension.

The current procedure for blocking the formation of calcium pectate is to destroy the pectinesterase activity by heat inactivation. As pointed out by Kew and Veldhuis in U.S. Pat. No. 2,995,448, this has the disadvantage of producing "cooked" or other off-flavored products. Their invention describes another method of inhibiting pectinesterase activity, by adding a water extract of dried grape leaves. Subsequently, other investigators concluded that the active component of this extract was a tannin, and later another researcher proved that tannic acid is indeed an effective inhibitor of pectinesterase.

Now, this invention attacks the chain of reactions leading to cloud loss at a different point. No attempt is made to inhibit pectinesterase activity. Instead, polygalacturonase, an enzyme which destroys demethylated pectins by hydrolysis is added. Thus, the formation of a calcium pectate precipitate is prevented by the removal, by hydrolysis, of demethylated pectins before it can combine with calcium.

For example, in three experiments in which Pectinol 41-P (a commercially available pectinase containing a high level of polygalacturonase) was added to fresh juice at the rate of one part in 2,000 and stored 24 hours at 80°F, the levels of water soluble pectins, calcium pectates, and protopectin were reduced by 36, 53, and 75 percent respectively.

Since pure preparations of polygalacturonase are not easily obtainable at the present time, commercially available pectinases which are mixtures of pectic enzymes must be used. These commonly contain pectinesterase (PE), polygalacturonase (PG), and polymethylgalacturonase (PMG). For the purposes described herein it is desirable to use a preparation having a high ratio of PG activity to PE activity. In addition we have found that the presence of substantial PMG activity is detrimental to the function of the pectinase as a cloud stabilizer. Examination of a number of commercial pectinases revealed that those having the highest ratio of PG activity to PMG activity were the most effective in stabilizing cloud. Several of these pectinases have provided good control of cloud loss at a concentration of one part to 500 parts of juice.

Modifications which can be employed: It is to be understood that any enzyme preparation containing polygalacturonase activity, either alone or in combination with other enzymes which are not antagonistic to the polygalacturonase action whether derived from plant, fungal or bacterial sources, will satisfy the conditions of this disclosure and be within the purview of this invention.

Another modification which can be employed is the addition of a proteolytic enzyme such as ficin, papain, or bromelin in addition to the polygalacturonase. We have found that the addition of a protease enhances the breakdown of calcium pectate by polygalacturonase. Juice treated thus has a stable cloud of greater turbidity than the cloud of freshly extracted juice. The proteolytic enzymes mentioned above by name are, of course, only given by way of example; any active protease derived from any source would suffice.

The following examples are presented to illustrate the preferred embodiments of the invention, and are not meant to be limitations of the invention in any manner whatever.

EXAMPLE 1

Four hundred fifty pounds of oranges were processed, yielding 27.5 gallons of juice. 20 grams (0.70 oz) of Rohm and Haas Pectinol 41–P was added to the juice and mixed until thoroughly dissolved. Immediately before packing and sealing in glass containers 30 grams (300 ppm) of DEPC was thoroughly blended into the juice. Since DEPC is not miscible with aqueous solutions, this step requires special methods and preferably special blending equipment. It is not within the scope of this example to go into detail on this step, inasmuch as such equipment is already commercially available for this specific purpose. After sealing, the containers were placed in 40°F storage. Juice treated in this manner had a stable cloud even though it had never been exposed at any step to heating.

EXAMPLE 2

Modifications: Freshly extracted orange juice was treated with Pectinol 41–P at a rate of one part enzyme to 5000 parts juice. In addition ficin, a proteolytic enzyme derived from the sap of certain trees of the genus *Ficus*, was added to the juice at a rate of one part ficin to 10,000 parts juice. 300 ppm of DEPC was blended into the juice immediately before filling into glass containers. The containers were then placed in 40°F storage.

After centrifuging for 10 minutes at 470 × $g$ to remove pulp, the freshly extracted juice had a light transmission of 51.9 percent, when measured with a Lumetron colorimeter equipped with a 650 m$\mu$ filter. After 38 days storage at 40°F, a sample of this juice with no enzyme treatment had a light transmission of 92.8 percent, indicating almost complete clarification. The juice treated with Pectinol 41–P and ficin had a light transmission of 54.6 percent after 38 days, demonstrating the retention of a stable juice cloud.

We claim:

1. A method of stabilizing the cloud of a freshly extracted citrus fruit juice comprising mixing with the freshly extracted citrus fruit juice (a) a proteolytic enzyme selected from the group consisting of ficin, papain, and bromelin, (b) a pectinase having a high level of polygalacturonase activity, and (c) diethyl pyrocarbonate as a chemical sterilant to protect the juice against spoilage organisms, said proteolytic enzyme, pectinase, and sterilant being employed in the proportion of about 0.5 part to 1 part to 1.5 parts, respectively, per 5,000 parts of the citrus fruit juice.

2. The method of claim 1 wherein the citrus fruit juice is orange juice and the proteolytic enzyme is ficin.

* * * * *

UNITED STATES PATENT OFFICE
CERTIFICATE OF CORRECTION

Patent No. 3,754,932  Dated August 28, 1973

Inventor(s) Robert A. Baker and Joseph H. Bruemmer

It is certified that error appears in the above-identified patent and that said Letters Patent are hereby corrected as shown below:

The title in the above patent should be corrected to read as follows:

PROTEASE AND PECTINASE ADDITIVE TO CITRUS JUICES

Signed and sealed this 5th day of November 1974.

(SEAL)
Attest:

McCOY M. GIBSON JR.
Attesting Officer

C. MARSHALL DANN
Commissioner of Patents